(12) United States Patent
Uhler et al.

(10) Patent No.: US 7,854,306 B2
(45) Date of Patent: Dec. 21, 2010

(54) CLUTCH ASSEMBLY WITH AN OIL PUMP CLUTCH HOUSING AND A CARRIER ENGAGED WITH A CLUTCH PACK OUTER CIRCUMFERENCE

(75) Inventors: Adam Uhler, Sterling, OH (US); Philip George, Wooster, OH (US); Todd Sturgin, Shreve, OH (US); Jeffrey Hemphill, Copley, OH (US)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 560 days.

(21) Appl. No.: 11/706,583

(22) Filed: Feb. 15, 2007

(65) Prior Publication Data

US 2007/0193848 A1     Aug. 23, 2007

Related U.S. Application Data

(60) Provisional application No. 60/775,621, filed on Feb. 22, 2006, provisional application No. 60/775,619, filed on Feb. 22, 2006, provisional application No. 60/775,620, filed on Feb. 22, 2006, provisional application No. 60/775,622, filed on Feb. 22, 2006, provisional application No. 60/775,623, filed on Feb. 22, 2006.

(51) Int. Cl.
*F16D 21/06* (2006.01)
*F16D 13/72* (2006.01)

(52) U.S. Cl. .................... 192/48.8; 192/70.12

(58) Field of Classification Search ................ 192/48.8, 192/87.11, 48.603, 48.619
See application file for complete search history.

(56) References Cited

U.S. PATENT DOCUMENTS

| 2,976,569 | A   | 6/1959  | Quere et al.      |            |
|-----------|-----|---------|-------------------|------------|
| 3,009,553 | A   | 11/1961 | Henyon            | 192/48     |
| 3,291,272 | A   | 12/1966 | Fawick            | 192/84     |
| 4,010,833 | A * | 3/1977  | Brendel et al.    | 192/87.11  |
| 4,111,291 | A   | 9/1978  | Horstman          | 192/105 C  |
| 4,741,422 | A * | 5/1988  | Fuehrer et al.    | 192/48.617 |
| 5,875,536 | A   | 3/1999  | Ring              | 29/407.1   |
| 6,196,078 | B1  | 3/2001  | DeJonge et al.    | 74/473.12  |
| 6,497,158 | B1  | 12/2002 | Daly et al.       | 73/866.5   |
| 6,533,705 | B1  | 3/2003  | Giefer et al.     | 477/96     |

(Continued)

FOREIGN PATENT DOCUMENTS

DE          2608348          9/1976

(Continued)

*Primary Examiner*—Richard M. Lorence
(74) *Attorney, Agent, or Firm*—Simpson & Simpson, PLLC

(57) ABSTRACT

The present invention broadly comprises a ring carrier with a wall arranged to engage at least a portion of an outer circumference of a clutch pack for a clutch assembly for a vehicle and a clutch housing with a wall arranged to engage at least a portion of an inner circumference of the clutch pack. The wall for the housing includes at least one opening and the clutch housing is arranged to pump fluid through the opening in the wall independent of the rotation of an output hub for the carrier. The clutch housing can be configured as an inner clutch housing. The clutch housing includes a connecter portion arranged to transfer engine torque to the cylindrical wall from an outer housing of the clutch assembly connected to an engine crankshaft. The present invention also includes a clutch assembly with the ring carrier and clutch housing.

9 Claims, 12 Drawing Sheets

U.S. PATENT DOCUMENTS

| | | | |
|---|---|---|---|
| 6,588,294 B1 | 7/2003 | Rogg | 74/473.21 |
| 6,708,807 B1 | 3/2004 | Martin | 192/70.19 |
| 6,819,997 B2 | 11/2004 | Buchanan et al. | 701/67 |
| 6,976,569 B2 | 12/2005 | Khaykin et al. | 192/220.4 |
| 7,497,312 B2 * | 3/2009 | Braford, Jr. | 192/48.603 |
| 2001/0035328 A1 * | 11/2001 | Tanikawa | 192/87.11 |
| 2003/0075413 A1 * | 4/2003 | Alfredsson | 192/87.15 |
| 2005/0139442 A1 | 6/2005 | Agner et al. | 192/48.8 |

FOREIGN PATENT DOCUMENTS

| | | |
|---|---|---|
| DE | 4343112 | 6/1995 |
| DE | 4408666 | 9/1995 |
| DE | 10338558 | 3/2004 |
| DE | 10334867 | 2/2005 |
| DE | 10 2004 013 265 A1 | 3/2005 |
| DE | 102005027610 | 12/2005 |
| EP | 0812998 | 8/2001 |
| EP | 1422430 | 5/2004 |
| EP | 1610021 | 12/2005 |
| JP | 57-79332 A * | 5/1982 |

* cited by examiner

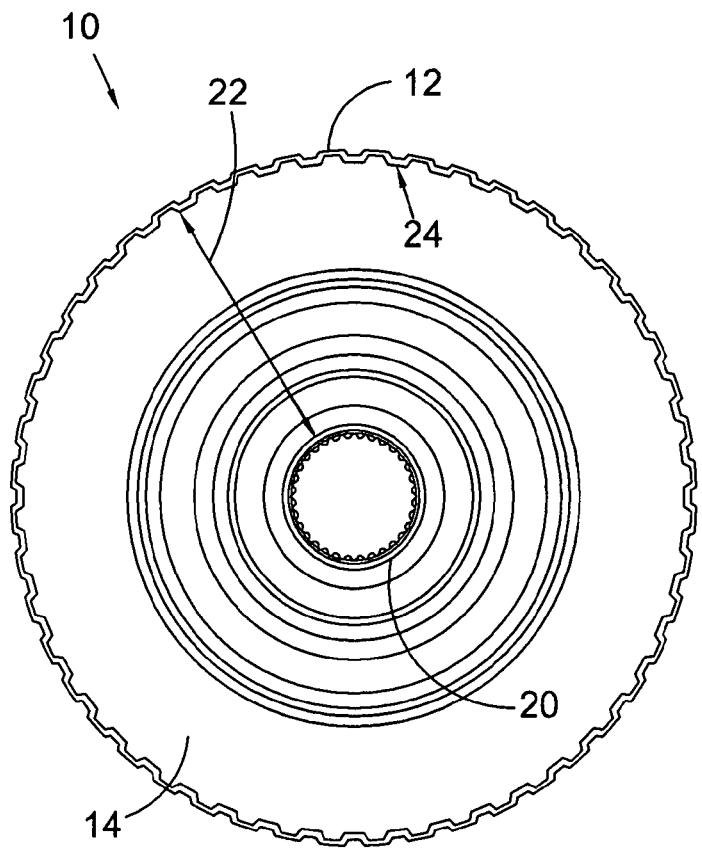
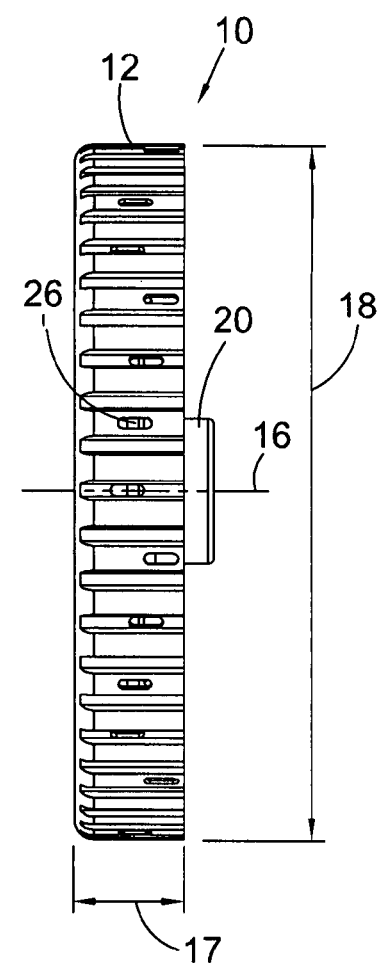
Fig. 2
Fig. 3

CLUTCH ASSEMBLY WITH AN OIL PUMP CLUTCH HOUSING AND A CARRIER ENGAGED WITH A CLUTCH PACK OUTER CIRCUMFERENCE

CROSS-REFERENCE TO RELATED APPLICATIONS

This application claims the benefit under 35 U.S.C. §119(e) of U.S. Provisional Application No. 60/775,621 filed Feb. 22, 2006; U.S. Provisional Application No. 60/775,619 filed Feb. 22, 2006; U.S. Provisional Application No. 60/775,620 filed Feb. 22, 2006; U.S. Provisional Application No. 60/775,622 filed Feb. 22, 2006; and U.S. Provisional Application No. 60/775,623 filed Feb. 22, 2006.

FIELD OF THE INVENTION

The invention relates to improvements in apparatus for transmitting force between a rotary driving unit (such as the engine of a motor vehicle) and a rotary driven unit (such as the variable-speed transmission in the motor vehicle). In particular, the invention relates to a clutch housing engaging an inner circumference of a clutch pack and a ring carrier engaging an outer circumference of a clutch pack. Further, the invention relates to a clutch housing arranged to pump fluid through holes in a wall for the housing whenever a crankshaft is rotating.

BACKGROUND OF THE INVENTION

FIG. 14 shows a dual clutch assembly 700 from commonly assigned, and therefore, uncitable, United States Patent Application No. 2005/0139442 filed Dec. 23, 2004 and published Jun. 30 2005, which application is incorporated herein by reference. In FIG. 14, clutch housing 702 is connected to outer housing 704. Engine torque is transmitted to housing 704 and transmitted to housing 702. Housing 702 transmits the torque to clutch plates 706. In turn, the clutch plates, when engaged, transmit the torque to carrier 708. Openings in the wall of the carrier are provided for oil flow through the assembly. The rotation of the carrier generates centripetal force that helps to pump oil through the openings. The carrier only rotates when the clutch pack is engaged. For example, axial force is applied to begin to engage plates in the clutch pack. The plates in the clutch pack go through a slippage mode and then fully engage. In parallel, the carrier begins to rotate, rotation increase through the slippage mode, and synchronizes with the engine torque input when the plates fully engage. The greatest amount of heat is generated during the slippage mode and consequently, oil cooling requirements are greatest during the slippage mode. Therefore, cooling requirements are typically greatest at the beginning of the slippage mode. The oil flow would be greater if the pumping action of the carrier were increased during the slippage mode.

Assembly 700 uses lever springs, for example, spring 710, to provide the axial force necessary to engage plates in a clutch pack. Typically, separate fulcrum elements, such as element 712, are used to transfer axial force from the springs to the clutch packs. If the fulcrum were eliminated, the parts count, cost, and complexity of a clutch assembly could be reduced.

Thus, there is a long-felt need for increasing oil flow through a clutch housing while plates in a clutch pack for the housing are slipping. Further, there is a long-felt need for a simplified means of transferring axial force from a lever spring to a clutch pack in a clutch housing.

BRIEF SUMMARY OF THE INVENTION

The present invention broadly comprises a ring carrier with a substantially cylindrical wall arranged to engage at least a portion of an outer circumference of a clutch pack for a clutch assembly for a vehicle. The carrier also includes an output hub. The clutch pack includes an inner circumference and in some aspects, the assembly includes a clutch housing arranged to engage the inner circumference.

The present invention also broadly comprises a clutch housing with a substantially cylindrical wall arranged to engage at least a portion of an inner circumference of a clutch pack in a clutch assembly for a vehicle. The cylindrical wall includes at least one opening, the assembly includes fluid and a rotatable output hub and the clutch housing is arranged to pump the fluid through the at least one opening independent of the rotation of the output hub. The clutch housing is arranged to pump the fluid through the at least one opening whenever an outer housing for the assembly is rotating. The outer housing is connected to an engine crankshaft for the vehicle and to the clutch housing. In some aspects, the clutch housing is configured as an inner clutch housing for the assembly.

The present invention further broadly comprises a clutch assembly for a vehicle including a clutch housing arranged to engage an inner circumference of a clutch pack and a carrier arranged to engage an outer circumference of the clutch pack. The carrier includes a substantially cylindrical carrier wall arranged to engage the outer circumference. The clutch housing includes a substantially cylindrical housing wall arranged to engage the inner circumference. In some aspects the assembly includes fluid, the carrier includes a rotatable output hub, the housing wall includes at least one opening, and the clutch housing is arranged to pump the fluid through the at least one opening independent of the rotation of the output hub. The clutch housing also is arranged to pump the fluid through the at least one opening whenever an outer housing for the assembly is rotating. The outer housing is connected to an engine crankshaft for the vehicle and to the clutch housing.

The clutch housing is arranged to transfer torque from the engine to the clutch pack. The clutch housing further comprises an annular housing disc connected to the outer housing of the assembly. The outer housing is connected to an engine crankshaft for the vehicle. In some aspects the first annular housing disc includes at least one connection point, the assembly includes a fulcrum engaged with the clutch pack and a first lever spring, the first lever spring has an outer circumference engaged with the at least one connection point, and the first spring is arranged to engage the fulcrum. In some aspects, the assembly includes a second lever spring and the clutch housing includes a second annular disc with a fulcrum portion arranged to engage the second lever spring and a clutch portion arranged to engage the clutch pack. In some aspects, the clutch housing is an inner clutch housing.

The present invention also broadly comprises a method for optimizing fluid flow through a clutch housing in a clutch assembly in a vehicle.

It is a general object of the present invention to provide a clutch housing able to pump cooling fluid independent of the rotation of an output hub for an assembly for the clutch housing.

It is another object of the present invention to provide a clutch housing able to pump cooling fluid whenever a crankshaft, associated with a clutch assembly for the clutch housing, is rotating.

It is a further object of the present invention to provide a clutch housing that provides maximum oil flow while plates in a clutch pack for the housing are slipping.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which:

FIG. 2 is a back view of the ring carrier shown in FIG. 1;

FIG. 3 is a side view of the ring carrier shown in FIG. 1;

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
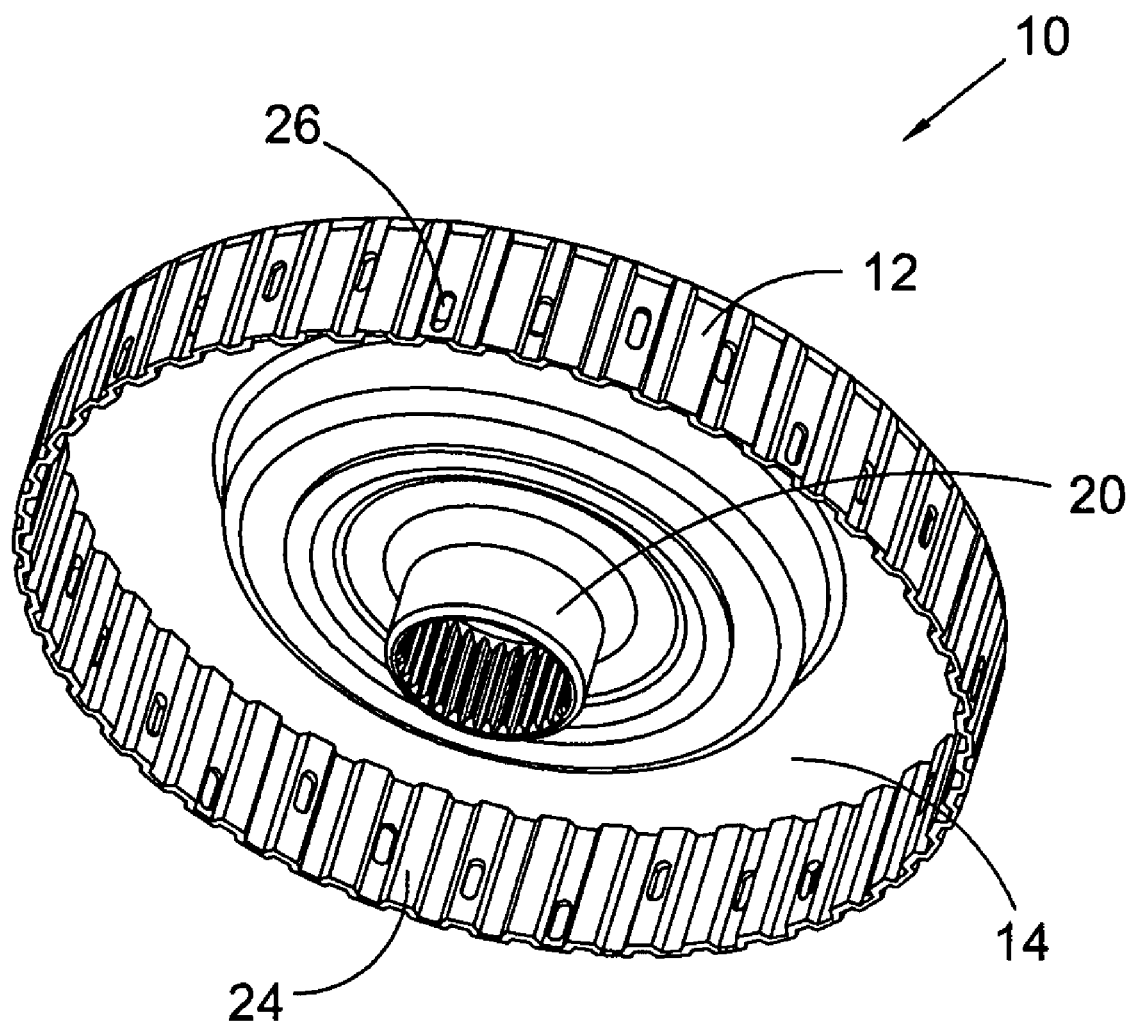
FIG. 1 is a perspective back view of a present invention ring carrier.

FIGS. 1, 2, and 3 are perspective back, back, and side views, respectively, of ring carrier 10. The following should be viewed in light of FIGS. 1 through 3. Ring carrier 10 includes ring carrier wall 12 and output connection section 14. In general, wall 12 is substantially cylindrical about longitudinal axis 16. That is, although wall 12 may be formed with splines or other surface features, the wall, splines, or surface features are in a cylindrical configuration. However, it should be understood that wall 12 is not limited to the shape shown in the figures and that other shapes for wall 12 are included within the spirit and scope of the invention as claimed. For example, wall 12 is not limited to a particular height 17 or diameter 18. Section 14 extends from wall 12, specifically, radially inward with respect to the wall and axis 16 and is connected to output hub 20. Ring carrier 10 is described in the context of a clutch assembly infra. Wall 12 and section 14 are integral, or formed from a same piece of material, in the figures. However, it should be understood that the wall and section can be formed from separate, joined pieces. Such pieces can be attached, secured, or connected by any means known in the art, including, but not limited to welding, riveting, or press fitting.

In some aspects, section 14 is a continuous/integral piece from wall 12 to hub 20. It should be understood that section 14 is not limited to the shape shown in the figures and that other shapes for section 14 are included within the spirit and scope of the invention as claimed. For example, section 14 is not limited to a particular radial dimension 22. In some aspects (not shown), two or more fixedly attached segments or pieces form section 14. The two or more segments are joined by any means known in the art, including, but not limited to, welding or riveting. Hub 20 can be connected to section 14 by any means known in the art, including but not limited to, riveting and welding. Hub 20 is configured for connection to an input shaft for a transmission (not shown) by any means known in the art, including, but not limited to, splines, notches, welding, or riveting.

Figure 14:
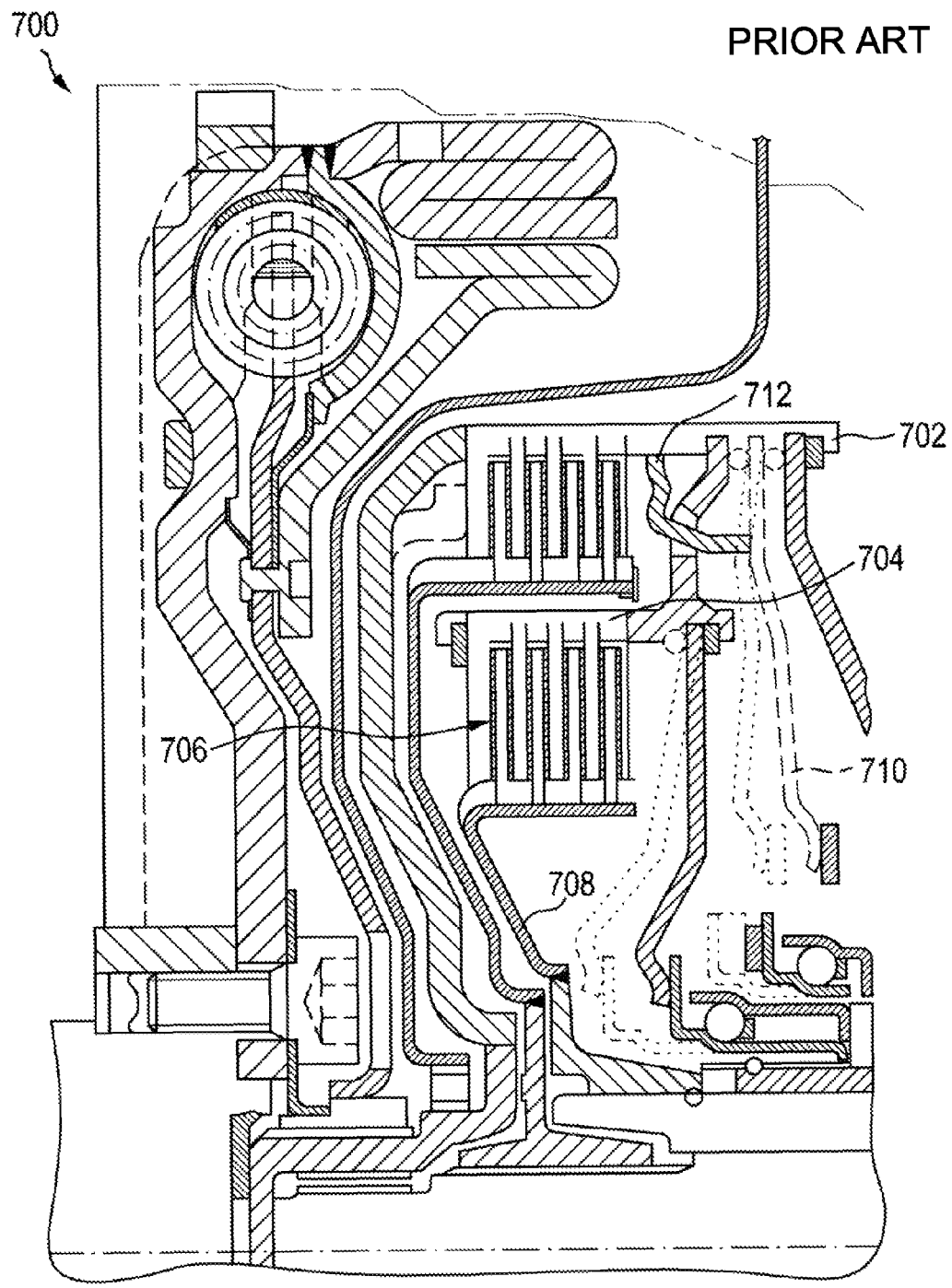
FIG. 14 shows a dual clutch assembly from a commonly assigned United States Patent Application; and, FIG. 15 is a flow chart illustrating a present invention method for optimizing fluid flow through a clutch housing in a clutch assembly in a vehicle.

When disposed in a clutch assembly, ring carrier 10 is arranged to receive and engage a clutch pack (not shown). Typically, ring carrier 10 is used with an inner clutch housing in a clutch assembly, however, it should be understood that other uses for the carrier are included in the spirit and scope of the claimed invention. Specifically, wall 12 includes inner surface 24, arranged to engage at least a portion of an outer circumference of the clutch pack. Any means known in the art can be used to engage surface 24 and the clutch pack, for example, complementary splines and notches. In some aspects, the carrier is used in a clutch assembly including a clutch housing (not shown, but described infra) engaged to an inner circumference of the clutch pack. The wall of ring carrier 10 is arranged to a receive engine torque from the clutch pack and transfer the torque to output hub 20 through segment 14. The housing receives the engine torque and transfers the torque to the clutch pack. In contrast, in the arrangement shown in FIG. 14, the inner clutch housing receives the torque and transfers the torque to the outer circumference of the clutch pack. In some aspects, openings 26 in wall 12 enable cooling fluid flow.

In some aspects, ring carrier 10 is stamped, reducing fabricating cost and complexity. However, it should be understood that other fabrication methods can be used to form ring carrier 10.

Figure 4:
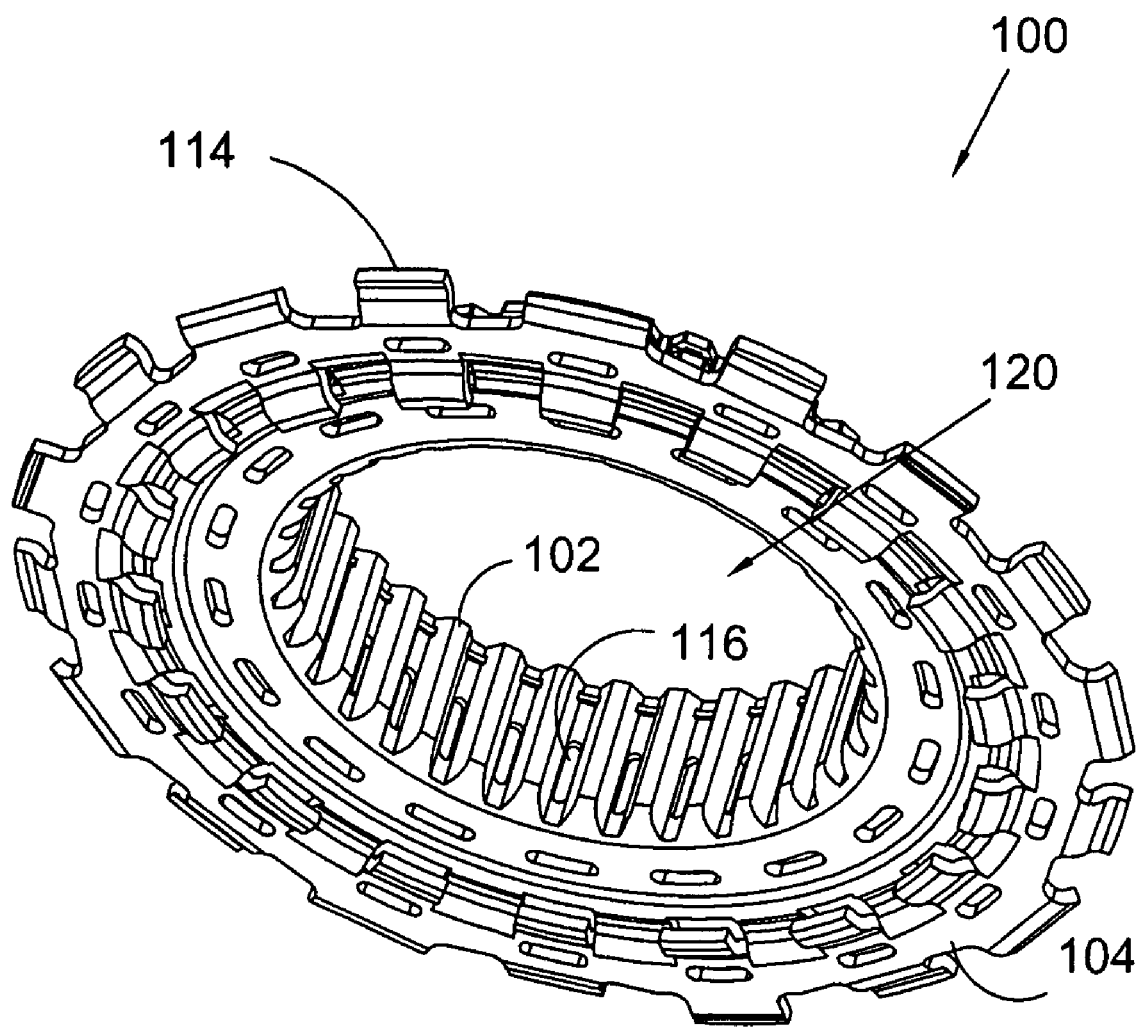
FIG. 4 is a perspective back view of a present invention clutch housing.
Figure 5:
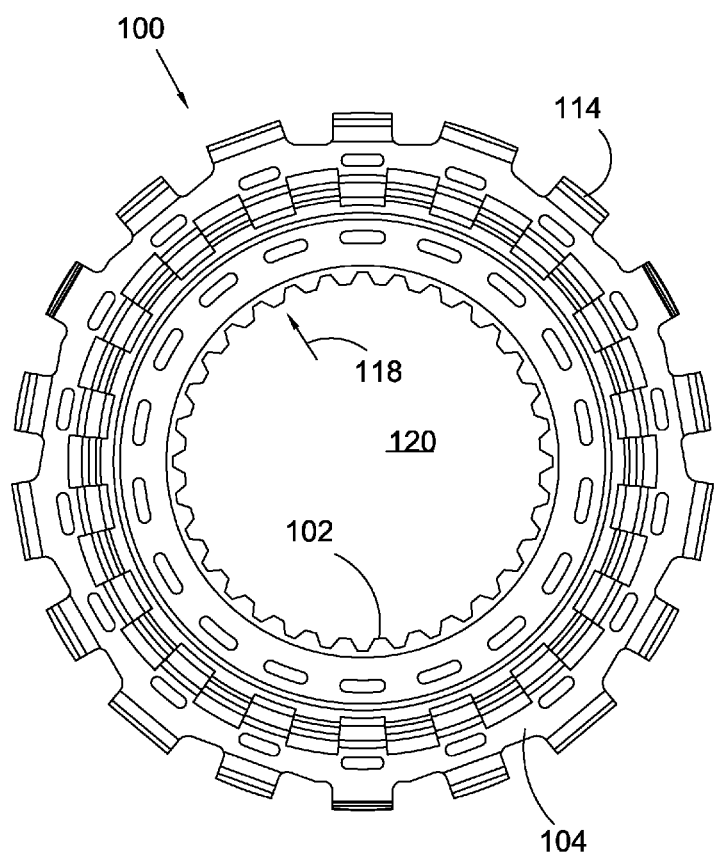
FIG. 5 is a back view of the clutch housing shown in FIG. 4.
Figure 6:
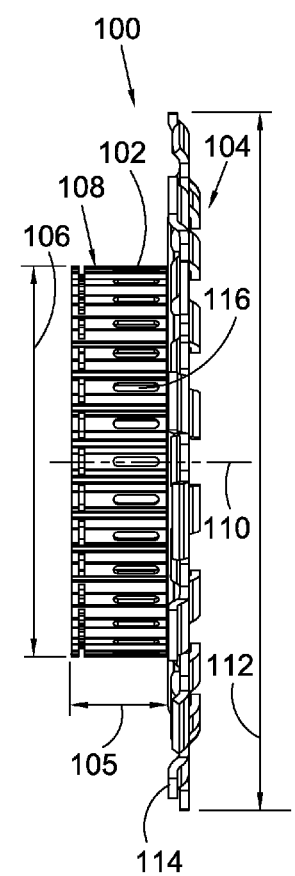
FIG. 6 is a side view of the clutch housing shown in FIG. 4.

FIGS. 4, 5, and 6 are perspective back, back, and side views, respectively, of present invention clutch housing 100. The following should be viewed in light of FIGS. 4 through 6. Clutch housing 100 includes wall 102 and connector portion 104. Wall 102 is substantially cylindrical, as described for wall 12 in FIGS. 1 through 3. However, it should be understood that wall 102 is not limited to the shape shown in the figures and that other shapes for wall 102 are included within the spirit and scope of the invention as claimed. For example, wall 102 is not limited to a particular height 105 or diameter 106. Wall 102, specifically outer surface 108 is arranged to engage at least a portion of an inner circumference of a clutch pack (not shown) for a clutch housing (not shown). Clutch housing 100 is described in the context of a clutch assembly infra.

Portion 104 is arranged to transfer engine torque to wall 102. In some aspects, portion 104 is an annular disc substantially orthogonal to wall 102 with respect to longitudinal axis 110. However, it should be understood that portion 104 is not limited to the shape shown in the figures and that other shapes for portion 104 are included within the spirit and scope of the invention as claimed. For example, portion 104 is not limited to a particular diameter 112. In some aspects, the crankshaft (not shown) for a vehicle (not shown) in which the clutch assembly is installed, is connected to an outer housing of the assembly. Torque from the engine of the vehicle is transferred from the crankshaft to the outer housing to clutch housing 100. The connection of clutch housing 100 to an outer housing is discussed infra.

Wall 102 includes at least one opening 116. Clutch housing 100 is not limited to the number, size, configuration, and orientation of openings shown and it should be understood that other numbers, sizes, configurations, or orientations of openings are included in the spirit and scope of the claimed invention. A wet clutch assembly includes a fluid, typically an oil, to cool the assembly, in particular, clutches or clutch packs in the assembly. Openings 116 are configured to enable fluid flow radially outward from axis 110, for example, in direction 118, from cavity 120, past outer circumference 108. The rotation of clutch housing 100 about axis 110 creates centripetal force in direction 118.

In some aspects, clutch housing 100 is stamped, reducing fabricating cost and complexity. However, it should be understood that other fabrication methods can be used to form clutch housing 100.

Figure 7:
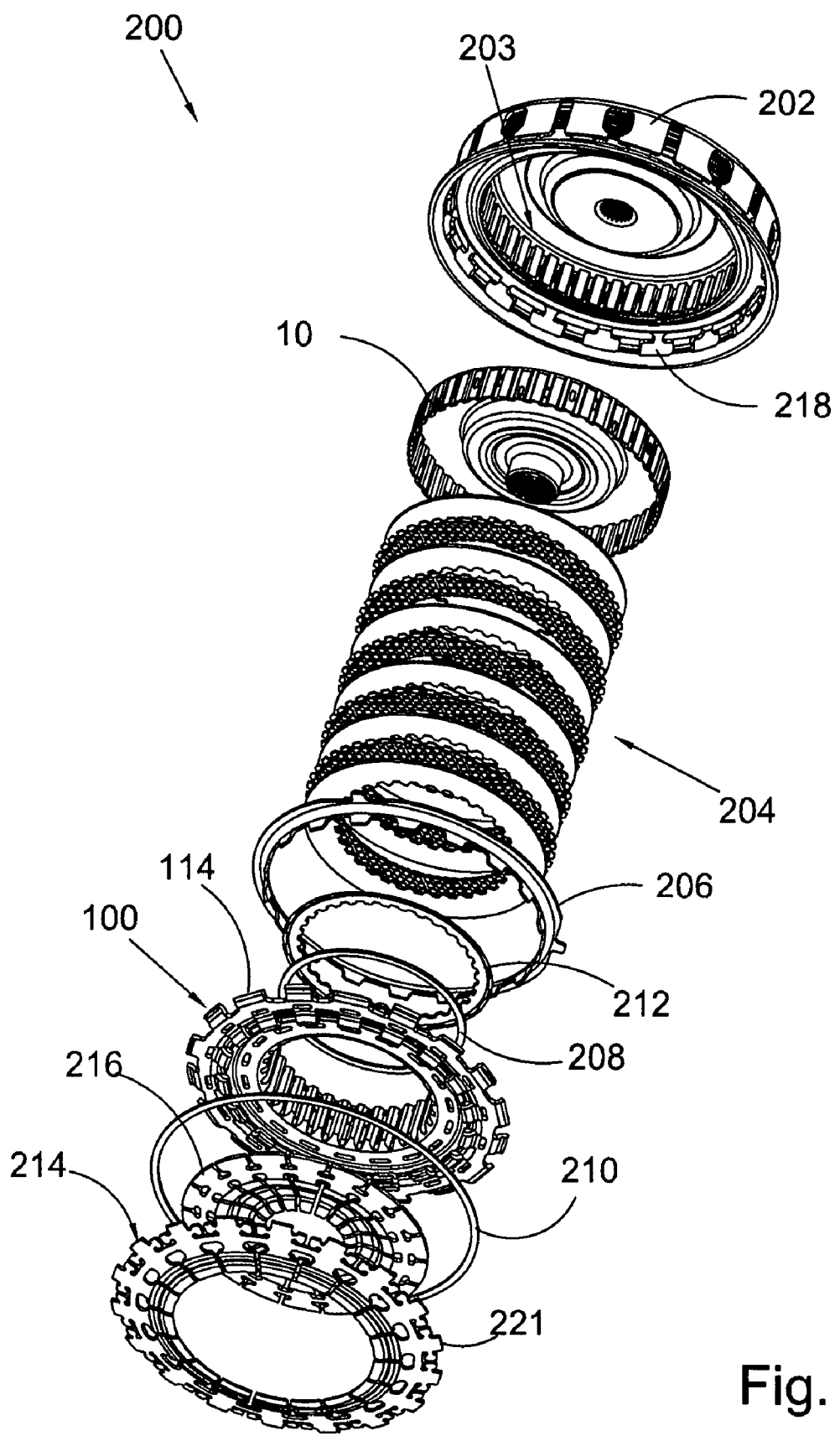
FIG. 7 is an exploded back view of a first present invention dual clutch assembly.

FIG. 7 is an exploded back view of present invention dual clutch assembly 200.

Figure 8:
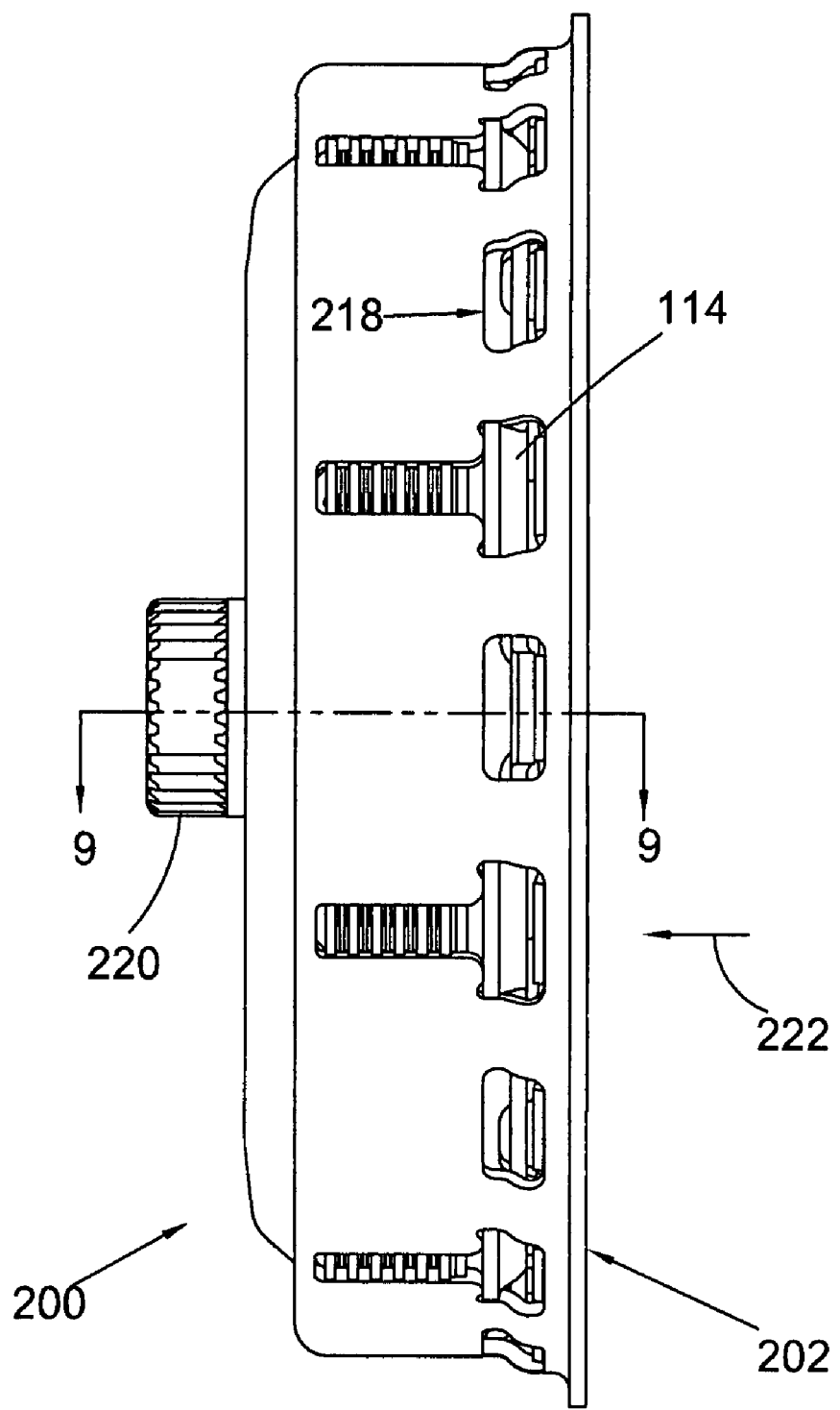
FIG. 8 is a side view of the assembly shown in FIG. 7.

FIG. 8 is a side view of assembly 200.

Figure 9:
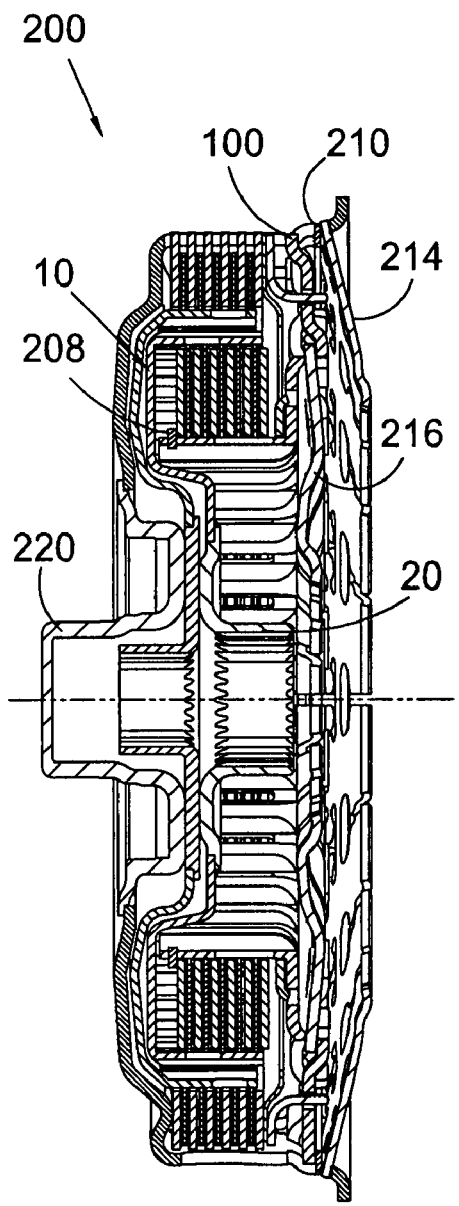
FIG. 9 is a cross-section of the assembly in FIG. 7 along line 9-9 in FIG. 8.

FIG. 9 is a cross-section of assembly 200 along line 9-9 in FIG. 8.

Figure 10:
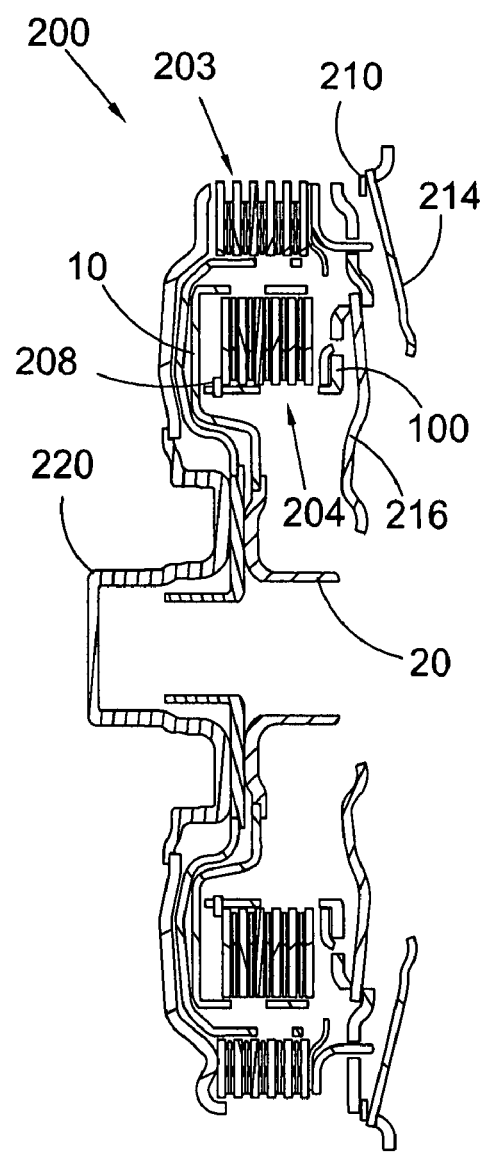
FIG. 10 is the cross-section of the assembly in FIG. 7 with background lines removed.

FIG. 10 is the cross-section of assembly 200 with background lines removed. The following should be viewed in light of FIGS. 1 through 10. Assembly 200 includes ring carrier 10 and clutch housing 100. The assembly also includes outer housing 202, clutch pack 203 (shown inside housing 202), clutch pack 204, dam/fulcrum 206, snap rings 208 and 210, dam/fulcrum 212, outer lever spring 214, and inner lever spring 216. Assembly 200 can be formed in any way known in the art. Therefore, it should be understood that the present invention is not limited to use with the number, type, and configuration of components shown for assembly 200 and other number, type, and configuration of components can be used with the present invention.

It should be understood that any means known in the art, for example, complimentary splines and notches or welding, can be used to connect clutch housing 100 to outer housing 202. In addition, in some aspects, a tab and slot arrangement as described in the commonly assigned U.S. patent application Ser. No. 11/706,656 titled "CLUTCH HOUSING WITH WIDE LEVER SPRING RETENTION SLOTS AND CLUTCH HOUSING WITH AXIALLY OFF-SET TABS," inventor Adam Uhler, filed Feb. 15, 2007, can be used. For example, tabs 114 engage with openings 218 in housing 202 to rotationally lock clutch housing 100 with housing 202. Hub 220, is connected to a crankshaft (not shown) for an engine and torque from the engine is transferred from hub 220 to clutch housing 100 via openings 218 and tabs 114. Any means known in the art can be used to connect hub 220 and the crankshaft. Ring carrier 10 and housing 100 are connected to clutch pack 204 using any means known in the art, for example, a spline and notch arrangement.

Spring 214 can be engaged with housing 202 using any means known in the art. In addition, in some aspects, an arrangement of spring tabs and slots in the housing as described in the commonly assigned U.S. patent application Ser. No. 11/706,584 titled "CLUTCH HOUSING WITH LEVER SPRING RETENTION SLOTS AND METHOD OF INSTALLING A LEVER SPRING," inventors Todd Sturgin and Adam Uhler, filed Feb. 15, 2007, can be used. For example, tabs 221 of spring 214 are inserted in openings 218.

As force is applied in axial direction 222 by spring 216 on clutch pack 204, the clutch pack engages and engine torque is transferred to ring carrier 10. Hub 20 is connected to an input shaft for a transmission (not shown) and the hub transfers the torque to the shaft. Any means known in the art can be used to connect hub 20 and the shaft.

It should be understood that any means known in the art, for example, complimentary splines and notches can be used to connect clutch pack 203 to housing 202. In addition, in some aspects, a tab and slot arrangement as described in the commonly assigned U.S. patent application Ser. No. 11/706,661 titled "CLUTCH HOUSING WITH OPENINGS TO ENGAGE A CLUTCH PLATE," inventors Sturgin et al., filed Feb. 15, 2007, can be used.

Figure 11:
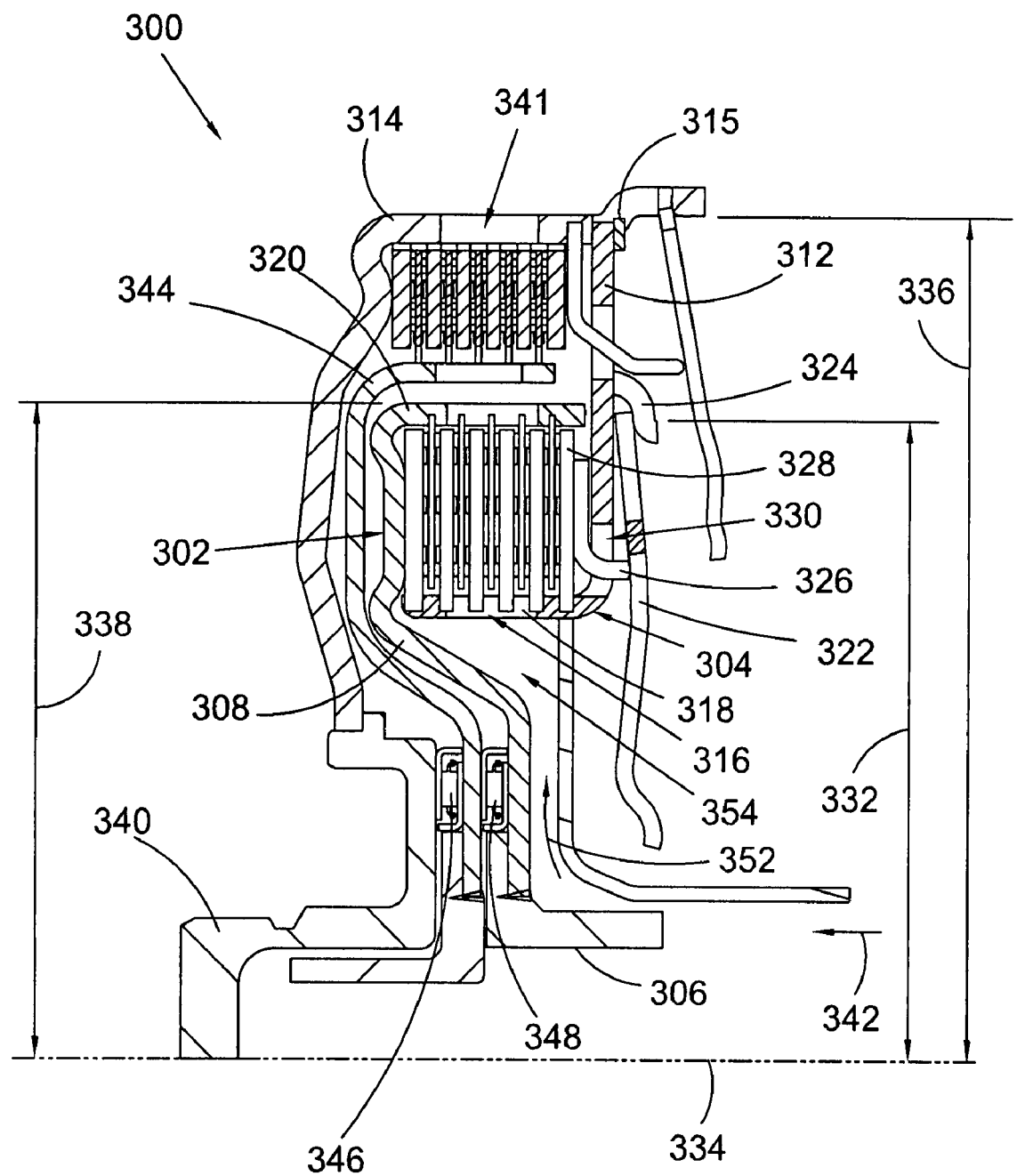
FIG. 11 is a cross-section of a second present invention dual clutch assembly.

FIG. 11 is a cross-section of present invention dual clutch assembly 300. Assembly 300 includes ring carrier 302 and clutch housing 304. The following should be viewed in light of FIGS. 1 though 11. The ring carrier and clutch housing are similar in function and configuration to ring carrier 10, described in FIGS. 1 through 3, and clutch housing 100, described in FIGS. 4 through 7, respectively and the discussions supra regarding ring carrier 10 and clutch housing 100 are generally applicable to ring carrier 302 and clutch housing 304, respectively. Ring carrier 302, specifically hub 306 of portion 308, is connected to an input shaft for a transmission (not shown). Any means known in the art can be used to connect hub 306 and the shaft. Portion 312 is connected to housing 314 using any means known in the art, for example, snap ring 315. In addition, in some aspects, the tabs arrangement described for FIGS. 4 through 6 can be used. Inner clutch pack 316 is connected to housing wall 318 and carrier wall 320 using any means known in the art, for example, the spline and notch arrangements shown in the figures.

Assembly 300 includes inner lever spring 322 engaged with connection elements 324. In some aspects, elements 324 are tabs or other such protrusions from portion 312. Fulcrum 326 is engaged with plate 328 and passes through openings 330 in the housing. Since clutch housing 304 is axially fixed with respect to housing 314 by snap ring 315, clutch housing 304 provides the necessary reaction points for the spring. Elements 324 are located a radial distance 332 from longitudinal axis 334 of assembly 300. In some aspects, distance 332 is less than radial distance 336. In some aspects, distance 332 is substantially equal to radial distance 338 from axis 334 to carrier wall 320. By substantially equal, we mean that distance 332 may be slightly less than, equal to, or slightly more than distance 338. Thus, it is not necessary to extend spring 322 all the way to housing 314, reducing the outside diameter of the spring. In this manner, the size, weight, and cost of the spring are all advantageously reduced. It should be understood that assembly 300 is not limited to a particular distance 332 and that distance 332 can be selected according to the material characteristics of spring 322 and operational parameters for assembly 300.

Outer housing 314 is connected to hub 340, which is connected to a crankshaft (not shown) for an engine (not shown). Torque from the engine is thus transferred from housing 314 to clutch pack 316 via portion 312. In response to axial force in direction 342, lever spring 322 reacts against elements 324 to move fulcrum 326 in direction 342, engaging clutch pack 316. Thus, engine torque is transferred from clutch housing 304 to ring carrier 302 via the clutch pack. Ring carrier 302 then transfers the torque to the output hub. It should be understood that fulcrum 326 and element 324 are not limited to the shapes, sizes, and configurations shown in the figures and that other respective shapes, sizes, and configurations are included in the spirit and scope of the claimed invention.

Ring carriers 302 and 344 are both able to move axially in assembly 300. Therefore, thrust bearing 346 is provided to separate outer housing 314 and carrier 344 and thrust bearing 348 is provided to separate carriers 344 and 302. That is, as axial forces push ring housing 314 and carriers 302 and 344 in direction 342, the thrust bearings separate the housing and carriers as described supra and allow ring carriers 302 and 344 and clutch housing 314 to rotate independently about axis 334.

As noted supra, cooling fluid is used in clutch assemblies, such as assembly 300 to cool clutch packs, such as clutch packs 316 and 341. Fluid flow 352 is introduced to cavity 354, formed in part by wall 318. Holes in wall 318, similar to openings 116 shown in FIGS. 4 through 6, enable flow 352 to continue past wall 318 to the clutch packs. That is, the fluid flows through the openings. Returning to FIGS. 4 through 6, the centripetal force generated by the rotation of clutch housing 100 boosts the flow of fluid though openings 116. Therefore, increasing the time period, during the operation of a clutch assembly, in which the clutch housing is rotating optimizes the flow of fluid through the openings. Increasing the flow through the openings increases the cooling of the clutch packs, optimizing the life-time and performance of the clutch packs. Returning to FIG. 11, engine torque is directly linked to carrier 304 via housing 314 and hub 340. That is, whenever the crankshaft and the outer housing are turning, carrier 304 is turning and generating centripetal force to abet the fluid flow. Alternately stated, the flow of fluid to clutch pack 316 is independent of the rotation of an output hub for the assembly. The preceding arrangement optimizes the time period mentioned supra, since clutch housing 304 is rotating whenever the engine is operating and the crankshaft is rotating. Thus, the preceding arrangement advantageously optimizes the oil flow to the clutch packs. Returning to FIG. 14, in contrast and as described supra, the carrier in assembly 700 only rotates when the clutch pack is engaged and engine torque is transferred from the housing through the clutch plates to the carrier.

It should be understood that the present invention is not limited to use with the number, type, and configuration of ancillary components, for example, as shown for assembly 300, and other number, type, and configuration of ancillary components can be used with the present invention.

Figure 12:
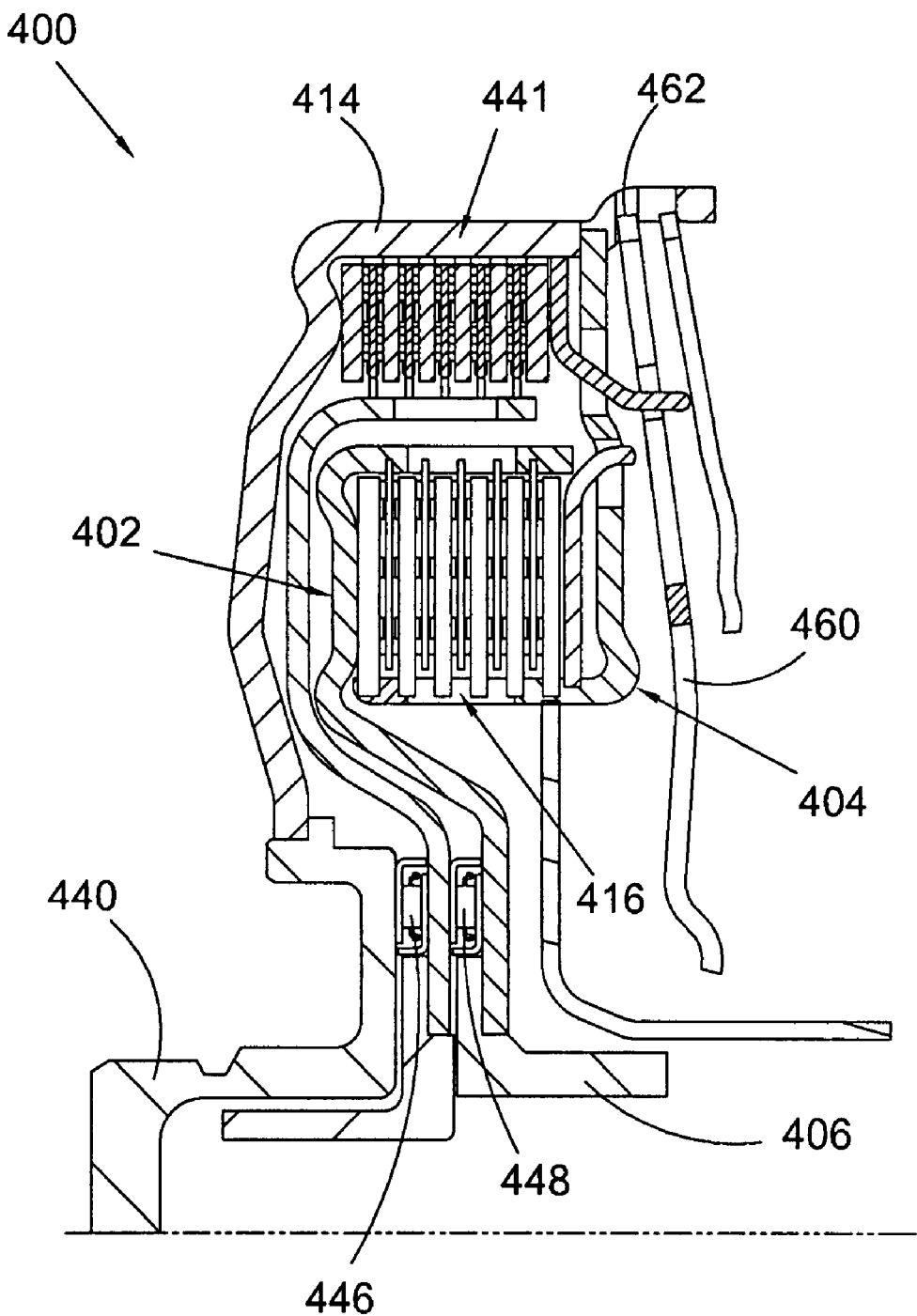
FIG. 12 is a cross-section of a third present invention dual clutch assembly.

FIG. 12 is a cross-section of present invention dual clutch assembly 400. Assembly 400 includes ring carrier 402 and clutch housing 404. The following should be viewed in light of FIGS. 1 though 12. Ring carrier 402 is connected to output hub 406. Clutch housing 404 is connected to outer housing 414. Inner clutch pack 416 is connected to clutch housing 404 and ring carrier 402. Outer housing 414 is connected to hub 440, which is connected to a crankshaft (not shown) for an engine (not shown). Clutch pack 441 engages outer housing 414. The components of assembly 400 are similar in function and configuration to the respective components shown for assembly 300 in FIG. 11, except for lever spring 460, and the discussions supra regarding such components in assembly 300 are applicable to FIG. 12. In particular, assembly 400 does not include a snap ring to axially fix housing 404. Instead, end 462 is axially fixed by the housing itself.

Figure 13:
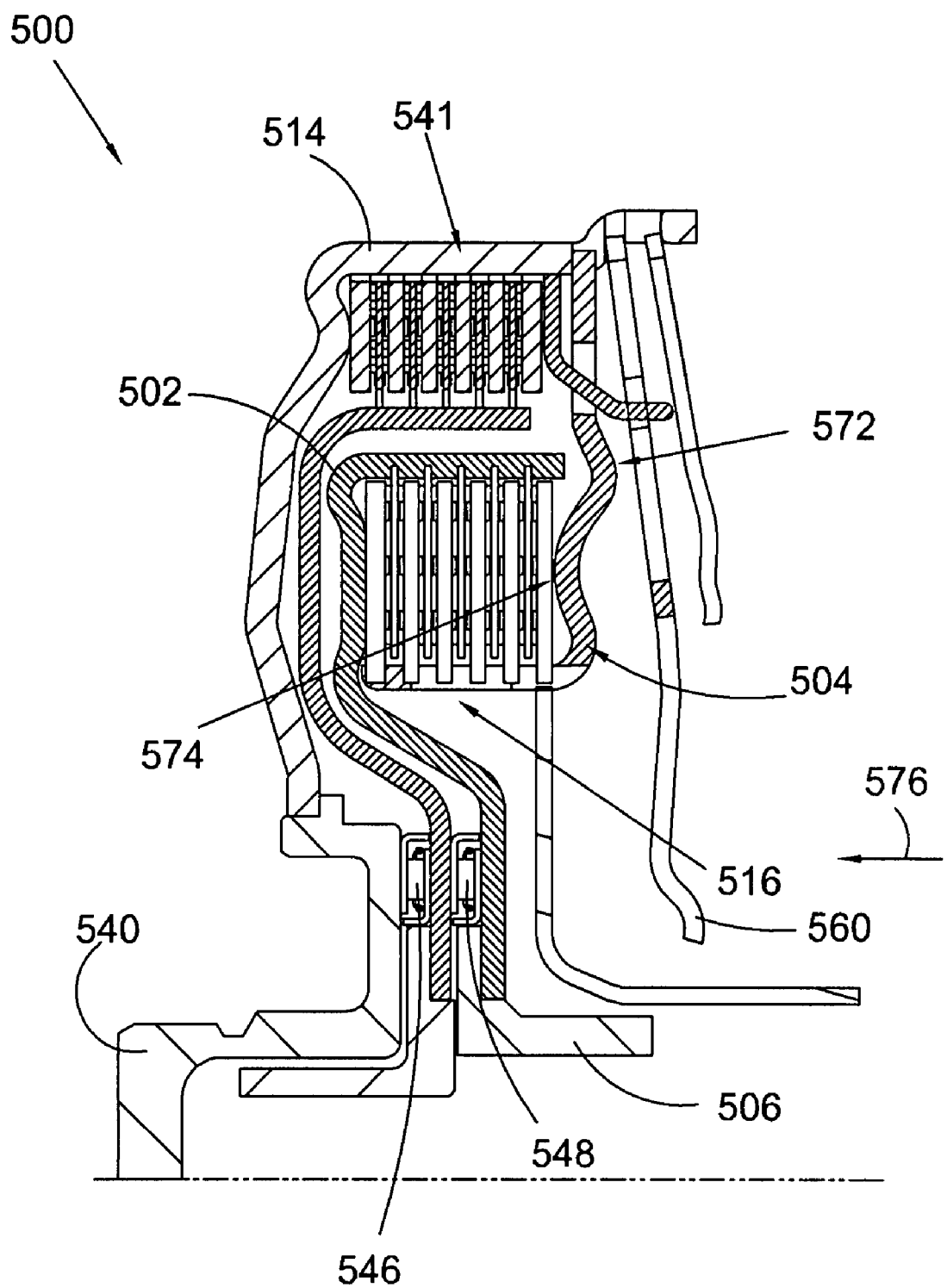
FIG. 13 is a cross-section of a fourth present invention dual clutch assembly.

FIG. 13 is a cross-section of present invention dual clutch assembly 500. The following should be viewed in light of FIGS. 1 though 13. Assembly 500 includes ring carrier 502 and clutch housing 504. Ring carrier 502 is connected to output hub 506. Clutch housing 504 is connected to outer housing 514. Inner clutch pack 516 is connected to clutch housing 504 and ring carrier 502. Outer housing 514 is connected to hub 540, which is connected to a crankshaft (not shown) for an engine (not shown). Clutch pack 541 engages outer housing 514. Lever spring 560 engages outer housing 514. The components of assembly 500 are similar in function and configuration to the respective components shown for assembly 400 in FIG. 12, except as follows, and the discussions supra regarding such components in assembly 400 are applicable to FIG. 13. Rather than including a separate fulcrum, such as fulcrum 326 in FIG. 11, housing 504 includes fulcrum portion 572 to engage spring 560 and clutch portion 574 engaged with pack 516. As axial force is applied to spring 560 in direction 576, spring 560 engages portion 572 and moves portion 574 in direction 576, engaging clutch pack 516. The configuration shown for carrier 504 eliminates the need for a separate fulcrum and thus reduces the parts count and complexity of assembly 500.

Figure 15:
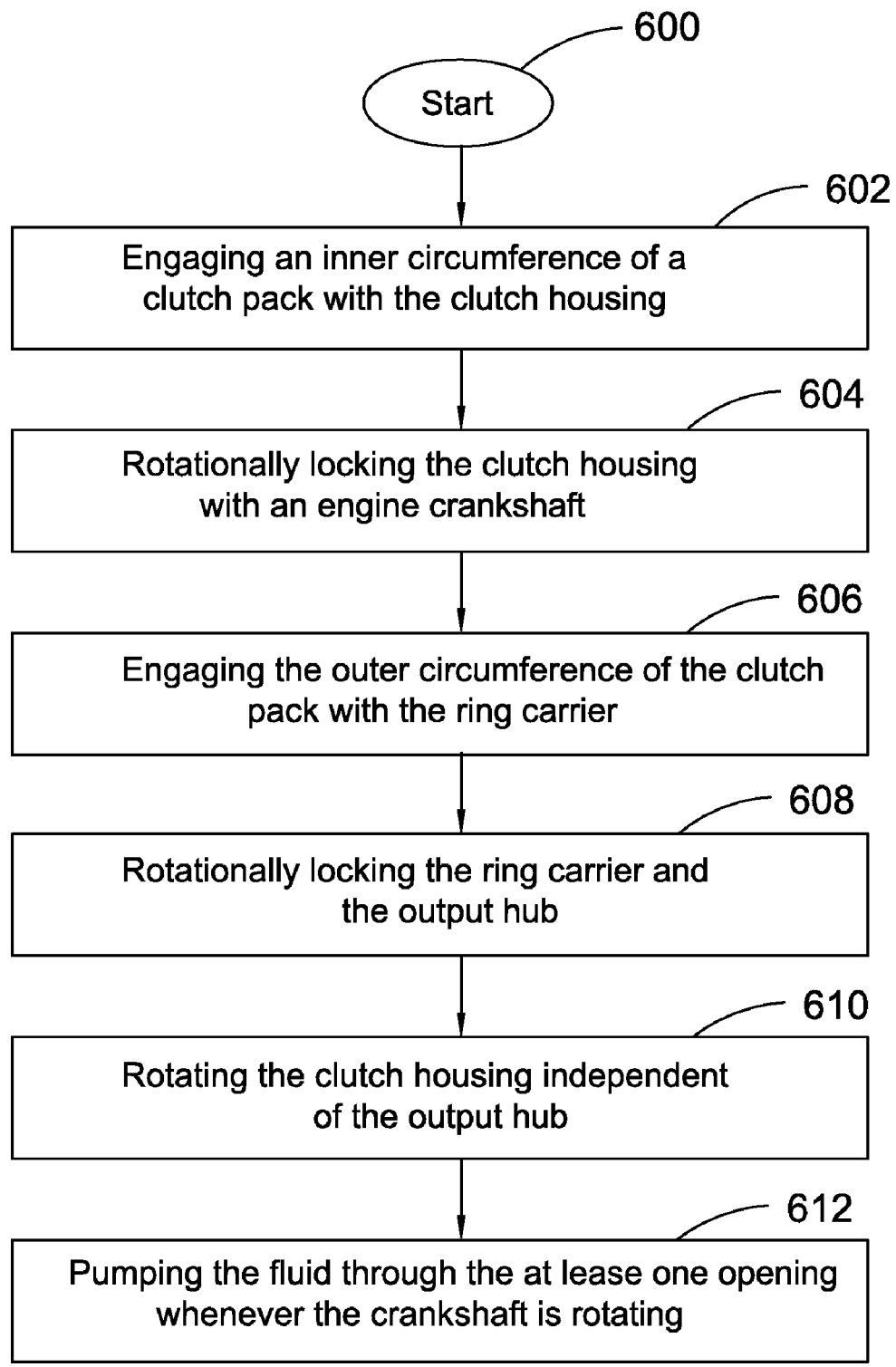

FIG. 15 is a flow chart illustrating a present invention method for optimizing fluid flow through a clutch housing in a clutch assembly in a vehicle. Although the method in FIG. 15 is depicted as a sequence of numbered steps for clarity, no order should be inferred from the numbering unless explicitly stated. The method starts at Step 600. Step 602 engages an inner circumference of a clutch pack with the clutch housing. Step 604 rotationally locks the clutch housing with an engine crankshaft. In some aspects, the assembly comprises a ring carrier and an output hub and the clutch pack further comprises an outer circumference. Then, Step 606 engages the outer circumference of the clutch pack with the ring carrier and Step 608 rotationally locks the ring carrier and the output hub. In some aspects, the assembly further comprises cooling fluid, the engine comprises a crankshaft, and the clutch housing comprises a wall engaging the inner circumference and having at least one opening. Then, Step 610 rotates the clutch housing independent of the output hub and Step 612 pumps the fluid through the at least one opening whenever the crankshaft is rotating.

Respective present invention clutch housings and carriers have been shown in dual clutch assemblies 200, 300, 400, and 500 (FIGS. 7, and 11 through 13, respectively). However, it should be understood that present invention clutch housings and carriers are not limited to dual clutch assemblies. For example, a present invention clutch housing and carrier can be used in a single clutch arrangement (not shown), for example, in a launch clutch.

It should be understood that any means known in the art can be used to adjust the clutch assemblies shown in the figures. In addition, in some aspects, the method described in the commonly assigned U.S. patent application Ser. No. 11/706,663 titled "DUAL CLUTCH PACK DUAL OPERATING CLUTCH AND METHOD FOR ADJUSTING SAME," inventors Uhler et al., filed Feb. 15, 2007, can be used.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What we claim is:

1. A clutch assembly for a vehicle, comprising:
   a housing;
   a first clutch unit with:
      a first clutch pack with an outer circumference directly connected to the housing; and,
      a first ring carrier engaged with a radially inner circumference of the first clutch pack;
   a second clutch unit located radially inside of the first clutch unit, the second clutch unit including:
      a clutch housing directly connected to the housing and including a portion extending radially inward from the housing;
      a second clutch pack with a inner circumference directly connected to the clutch housing; and,
      a second ring carrier, separate from the first ring carrier, engaged with an outer circumference of the second clutch pack; and,
   a lever with a first end held in a fixed position against the clutch housing and with a second end displaceable with respect to the first end to engage the second clutch pack, wherein:
      the portion of the clutch housing is axially disposed between the second clutch pack and the lever; and,
      torque received by the housing is transmittable radially inward from the housing to the inner circumference of the second clutch pack via the portion of the clutch housing.

2. The assembly of claim 1 wherein said second ring carrier further comprises a substantially cylindrical carrier wall, where said carrier wall is arranged to engage said outer circumference of the second clutch pack.

3. The assembly of claim 1 wherein said clutch housing further comprises a substantially cylindrical housing wall arranged to engage said inner circumference of the second clutch pack.

4. The assembly of claim 3 further comprising: a fluid, wherein:
   said second ring carrier further comprises a rotatable output hub,
   said substantially cylindrical housing wall further comprises at least one opening, and
   said clutch housing is arranged to pump said fluid through said at least one opening independent of said rotation of said output hub.

5. The assembly of claim 4 further comprising: a fluid, wherein:
   the housing forms an outer housing for the clutch assembly;
   said clutch housing is connected to said outer housing, and
   said clutch housing is arranged to pump said fluid through said at least one opening whenever said outer housing is rotating.

6. The assembly of claim 1 wherein said clutch housing is arranged to transfer torque to said second clutch pack.

7. The assembly of claim 6 wherein the housing forms an outer housing for the clutch assembly and wherein said clutch housing further comprises an annular housing disc connected to said outer housing.

8. The assembly of claim 7 wherein said annular housing disc further comprises at least one connection point; and, said assembly further comprising:
   a fulcrum engaged with said second clutch pack and a lever spring, said lever spring with an outer circumference engaged with said at least one connection point, and said spring arranged to engage said fulcrum.

9. The assembly of claim 1 further comprising: a lever spring; and, wherein said clutch housing further comprises an annular disc with a fulcrum portion arranged to engage said lever spring and a clutch portion arranged to engage said second clutch pack.

* * * * *